United States Patent
Bae

(10) Patent No.: US 7,177,321 B2
(45) Date of Patent: Feb. 13, 2007

(54) HANDLING PACKET-BASED DATA DESPITE PACKET CALL COLLISIONS IN MOBILE COMMUNICATIONS

(75) Inventor: Jung-Gon Bae, Kyongki-Do (KR)

(73) Assignee: LG Electronics Inc., Seoul (KR)

( * ) Notice: Subject to any disclaimer, the term of this patent is extended or adjusted under 35 U.S.C. 154(b) by 1080 days.

(21) Appl. No.: 10/224,593

(22) Filed: Aug. 21, 2002

(65) Prior Publication Data

US 2003/0064726 A1 Apr. 3, 2003

(30) Foreign Application Priority Data

Sep. 28, 2001 (KR) ............................... 2001-60703

(51) Int. Cl.
*H04L 12/413* (2006.01)
*H04J 3/16* (2006.01)

(52) U.S. Cl. ...................................... 370/447; 370/465

(58) Field of Classification Search ..................... None
See application file for complete search history.

(56) References Cited

U.S. PATENT DOCUMENTS

| | | | |
|---|---|---|---|
| 5,752,193 A * | 5/1998 | Scholefield et al. ...... | 455/452.2 |
| 5,894,472 A * | 4/1999 | de Seze ....................... | 370/337 |
| 5,966,378 A * | 10/1999 | Hamalainen ................. | 370/348 |
| 6,480,525 B1 * | 11/2002 | Parsa et al. .................. | 375/141 |
| 6,707,808 B1 * | 3/2004 | Vedrine ....................... | 370/337 |
| 6,987,726 B1 * | 1/2006 | Elliott ......................... | 370/217 |
| 6,987,982 B2 * | 1/2006 | Willenegger et al. ....... | 455/515 |
| 7,086,082 B1 * | 8/2006 | Kokkinen .................... | 725/135 |
| 2001/0007566 A1 | 7/2001 | Villatte et al. .............. | 370/445 |

OTHER PUBLICATIONS

ETSI EN 3000 940 v6.10.1 (Oct. 2000), Digital Cellular Telecommunications System (Phase 2+); Mobile Radio Interface Layer 3 Specification; (GSM 04.08 version 6.10.1 Release 1997) XP-002263296.

* cited by examiner

*Primary Examiner*—Andrew C. Lee
(74) *Attorney, Agent, or Firm*—Fleshner & Kim, LLP

(57) ABSTRACT

Packet call processing involving packet-based data transfers in a mobile communications system can handle a packet call if the mobile station has the ability to accommodate the packet call even when packet call collision occurs. Upon detecting a packet call collision between a first received packet call and a second received packet call, the mobile station determines whether a Network Service Access Point Identifier (NSAPI) is available and can be allocated to handle the second received packet call. Thus, an increased number of packet calls that can be processed simultaneously by the network and/or the mobile station so that Internet-based applications, as well as other high-speed data applications can be handled more effectively and efficiently. Such packet call collision detection and NSAPI allocation techniques are applicable to various wireless and/or mobile communications environments, such as GMS, GPRS, UTMS, etc. involving data packet transmissions whereby packet call collisions may occur.

21 Claims, 3 Drawing Sheets

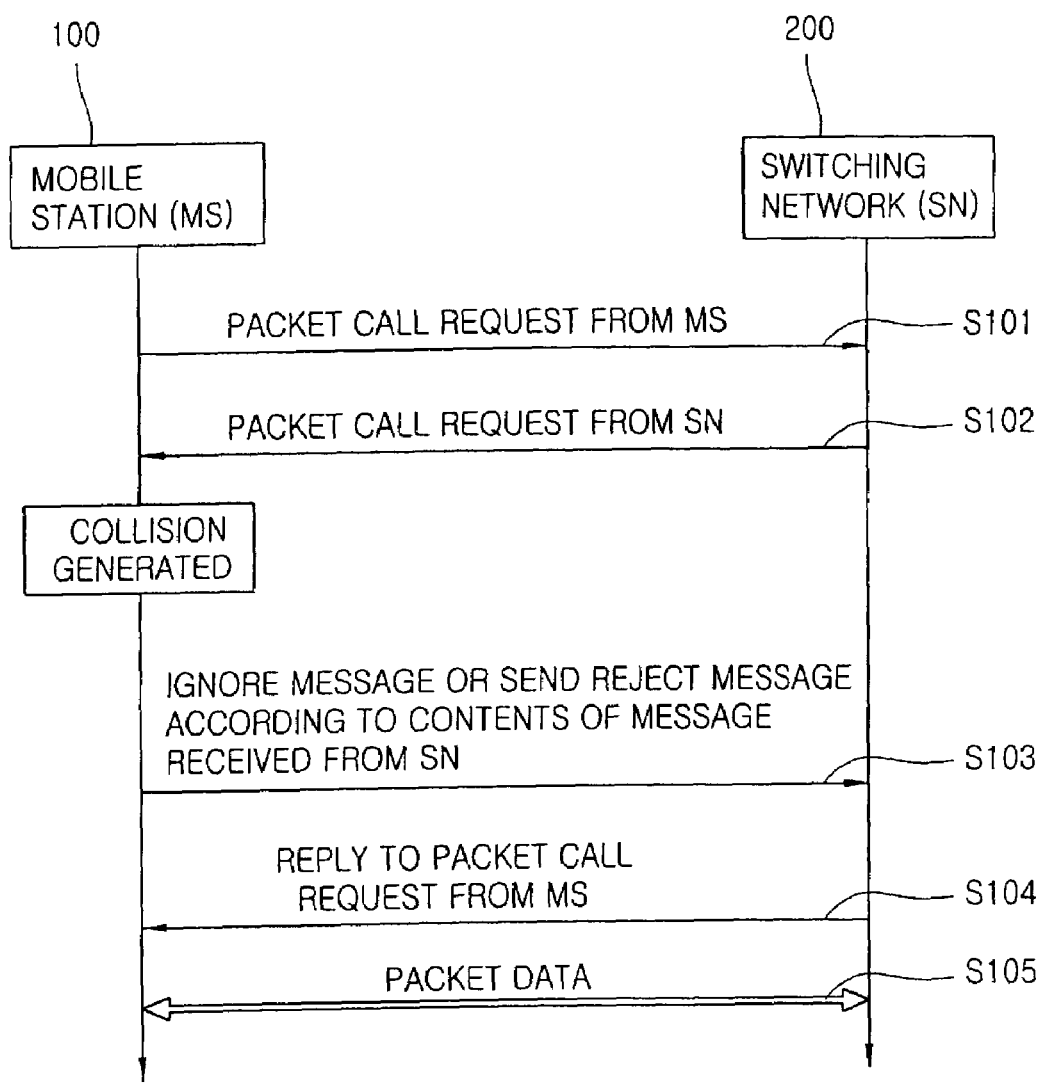

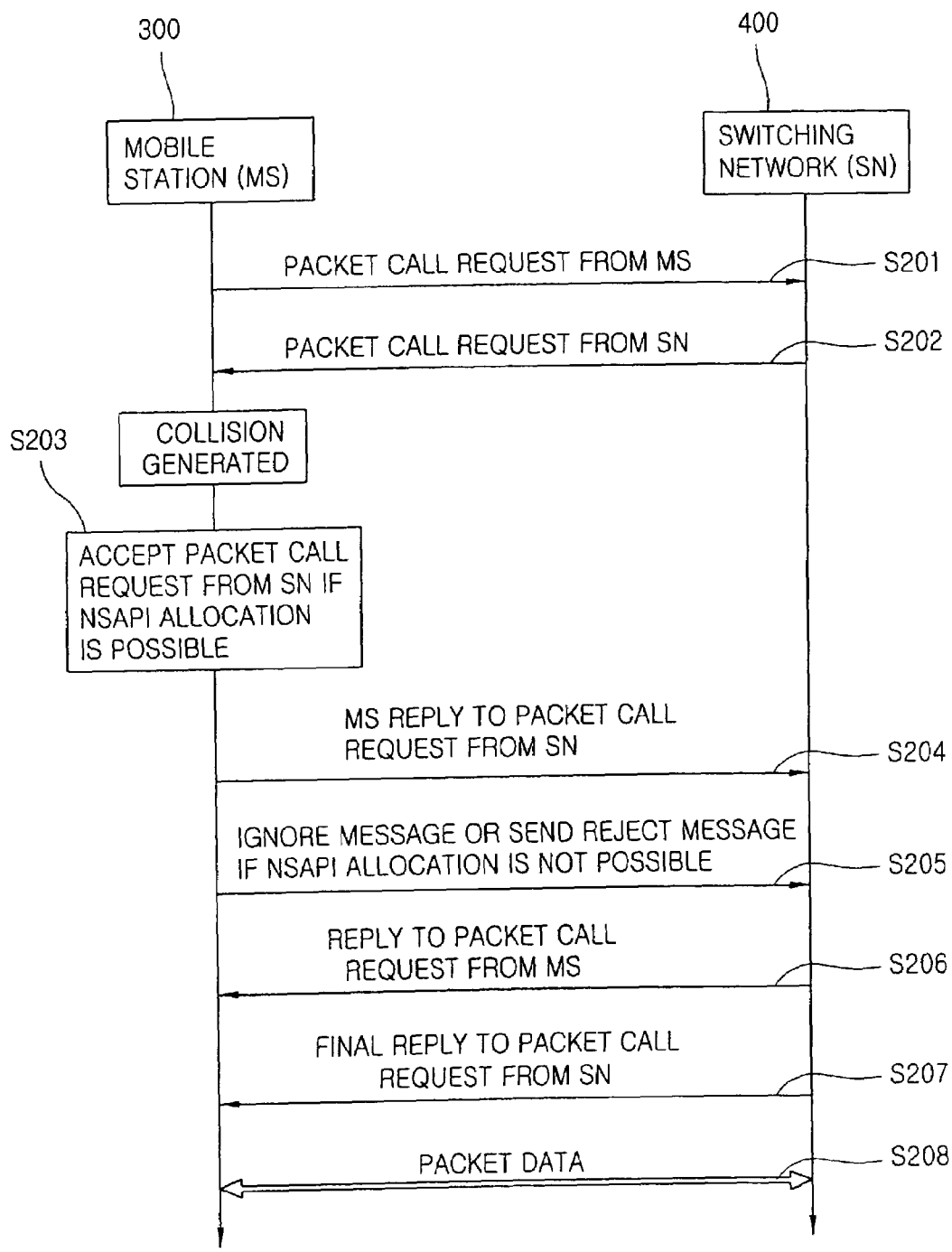

HANDLING PACKET-BASED DATA DESPITE PACKET CALL COLLISIONS IN MOBILE COMMUNICATIONS

FIELD OF THE INVENTION

The present invention relates to mobile communications in general, and more particularly, to handling packet data in a mobile communications system which allows a packet call to progress if the mobile station has the ability to receive or handle a packet call even upon packet call collisions.

BACKGROUND OF THE INVENTION

In recent years cellular and mobile phones have become increasingly popular. A cellular telephone is merely one example of what is referred to in telecommunications as a "mobile station". In general, a mobile station (MS) has two components: a mobile terminal (MT), which is typically a handset used to access the radio interface as a radio modem, and a terminal equipment (TE) which is typically a laptop or a Personal Digital Assistant (PDA). However, a mobile station may have the combined functionalities of a mobile terminal and terminal equipment. Thus, a mobile station (MS) can take on various forms other than a cellular (mobile) telephone, including a computer (e.g., a laptop computer) with mobile termination capabilities. Telecommunications services, including wireless Internet access, are provided between a mobile (or wireless) communications system (e.g., a cellular telecommunications network) and a mobile station over an air interface, e.g., over radio frequencies.

To satisfy recent subscriber demands for wireless Internet access and to develop third generation (3G) networks (including the development of Universal Mobile Telephone Service (UMTS) networks), many GSM operators are introducing General Packet Radio Service (GPRS). GPRS is considered as a service or feature of GSM. It was designed by ETSI (European Telecommunications Standards Institute) to be implemented over the existing infrastructure of GSM without interfering with the already existing services. This technology increases the data rates of existing GSM networks, allowing transport of packet-based data. GPRS is one major development in the GSM standard that benefits from packet switched techniques to provide mobile subscribers with the much needed high bit rates for bursty data transmission applications such as Web browsing. Thus, GPRS provides mobile subscribers with access to data communication applications such as electronic mail, corporate intranet networks, and the Internet using their mobile stations. Unlike circuit-switched second generation (2G) technology, GPRS is referred to as a so-called "always-on" service, allowing GSM operators to provide high speed Internet access at a reasonable cost by billing mobile station users for the amount of data they transfer rather than for the length of time they are connected to the network.

Here, it should be noted that the present disclosure is mainly concerned with packet data transfers in a mobile communications system. Thus, voice calls and the signal processing associated therewith are not described in great detail. Furthermore, signal processing, protocols, and other procedures for simultaneously handling data packets and voice calls are also not explained in depth so that the features of data packet transfers are not obscured.

Existing GSM networks use circuit-switched technology to transfer information (voice or data) between users. However, GPRS (and developing UMTS networks) uses packet switching and a physical channel is dynamically established only when data is being transferred. Once data has been transferred, the channel resource (a timeslot or the air interface) can be re-allocated to other users for more efficient use of the network.

When packet-switched data leaves the GPRS/GSM network, it is transferred to TCP-IP (Transmission Control Protocol—Internet Protocol) networks such as the Internet or X.25. Thus, GPRS includes new transmission and signaling procedures as well as new protocols for interworking with the Internet Protocol (IP) environment and other standard packet networks.

A mobile (or wireless) communications system can comprise various elements including a switching network and mobile station in communication therewith. In particular, GPRS technology uses existing GSM networks (a type of switching network) and adds new packet-switching network elements.

FIG. 1 depicts a logical architecture of a GPRS network. Although one skilled in the art would understand the various network elements (including protocols, interfaces, etc.) comprise the GPRS network, only certain relevant network elements will be described in detail herein.

There are mobile stations (MS) 2, each having a mobile terminal (MT) 4, which is typically a handset used to access the radio interface as a radio modem, and a terminal equipment (TE) 6. Each mobile station 2 is in communication with a Base Station Subsystem (BSS) 10, performing radio-related (e.g., wireless air interface) functions, which comprises a Base Transceiver Station (BTS) 12 and a Base Station Controller (BSC) 14. The BTS 12 handles the radio interface to the MS 2, while the BSC 14 provides control functions and physical links The BSS 10 is operatively connected with a Network Switching System (NSS) 20, which is responsible for call control, service control and subscriber mobility management functions. The BSS 10 comprises a Home Location Register (HLR) 22, a Mobile Switching Center (MSC) 24 and a Visitor Location Register (VLR) 26. The HLR 22 is a database storing and managing permanent data about the subscribers, including service profiles, location information, and activity status. The MSC 24 is responsible for telephony switching functions of the network, among various other functions. The HLR 22 and MSC 24 are connected via a so-called Map-D interface. The VLR 26 is a database used to store temporary data about the subscribers and is needed by the MSC 24 for servicing visiting subscribers.

A network element introduced by GPRS is the GPRS Support Node (GSN), which is necessary for the GSM network to support packet data service. There are two types of GSNs: an SGSN (serving-GSN) 28 and a GGSN (Gateway-GSN) 29.

The SGSN 28, which like the GSM mobile switching center and visitor location register (MSC 24/VLR 26), controls the connection between the network and the MS 2. The SGSN 28 provides session management and GPRS mobility management functions such as handovers and paging, and also counts the number of packets routed. The SGSN 28 attaches to the home location register HLR 22 via a so-called Gr interface and to the MSC 24/VLR 26 via a so-called Gs interface. Also, the SGSN 28 connects with other SGSNs 28 and GGSNs 29 via a so-called Gn interface. Furthermore, the SGSN 28 connects with the BSC 14 via a so-called Gb interface. The GGSN 29 is connected with a network (such as a Packet Data Network PDN) 30. The PDN 30 can be connected with a terminal 40 via a so-called Gi interface allowing users to access the PDN 30.

To initiate packet data transfers, a mobile station 2 must first attach itself to the GPRS network (a type of switching network) by a so-called "activation" procedure whereby a process known as Packet Data Protocol (PDP) context activation is performed. Here, the PDP context assigns an Internet Protocol (IP) address to the mobile station 2 if it has no static address. Upon activation, the mobile station 2 can access the network, request resources, send data, go into standby mode if no data is being transmitted, and repeat the above process over again.

More particularly, a PDP context activates a packet communication session with the SGSN 28. During the activation procedure, the mobile station 2 either provides a static IP address or requests a temporary IP address from the network. It also specifies the Access Point Name (APN) with which it wants to communicate, for example an Internet address or an Internet service provider. The mobile station 2 requests a desired quality of service (QoS) and a Network Service Access Point Identifier (NSAPI). Because the mobile station 2 can establish multiple PDP context sessions for different applications, the NSAPI is used to identify the data packets for a specific application. Then, the SGSN 28 and other elements in the network proceed to establish a connection with the mobile station 2 so that packet data can be transferred therebetween. For a given active PDP context, packet data transfers can be an uplink data transfer (i.e., initiated by the mobile station or mobile-originated) or a downlink data transfer (i.e., initiated by the network or mobile-terminated).

The mobile station 2 specifies its network service access point and the access point name (APN) of the Packet Data Network (PDN) it wants to connect to. The APN specifies the target PDN network identifier such as "intranet.company-name.com" and the operator domain name such as "operator-name.country.gprs". The SGSN 28 identifies the corresponding GGSN 29 and makes it aware of the mobile station 2. A two-way point-to-point path or a "tunnel", is uniquely identified by a tunnel identifier (TID) and is established between the SGSN 28 and the GGSN 29. Tunneling is the means by which all encapsulated packets are transferred from the point of encapsulation to the point of decapsulation. In this case, the SGSN 28 and GGSN 29 are the two end-points of the tunnel. At the mobile station 2 side, a PDP context is identified by a network service access point identifier (NSAPI). The mobile station 2 uses the appropriate NSAPI for subsequent data transfers to identify a PDN 30. On the other hand, the SGSN 28 and GGSN 29 use the TID to identify transfers with respect to a specific mobile station 2. Depending on the GPRS implementation, a mobile station 2 can be assigned static or dynamic addresses. For instance, the operator can assign a permanent (static) PDP address to the mobile station 2 or choose to assign a different address for each PDP context activated dynamically. Also, a visited network may assign dynamically an address to the mobile station 2 for each PDP context activated.

FIG. 2 shows a conventional art activation procedure between a mobile station and a switching network (i.e., relevant portions of the GPRS/GSM network) of a mobile communications system when there is a packet call collision. Here, it should be understood that only data transfers involving the so-called "packet calls" are considered. Voice calls may co-exist with packet calls, and call collisions may occur therebetween. However, the handling of collisions between voice calls and packet calls are not described in depth in this disclosure so that the features of handling packet call collisions are not obscured.

A mobile station 100 and a switching network 200 (e.g., the GSM network, the GPRS network, or portions thereof) communicate with one another in order to exchange data packets therebetween. A so-called "packet call" is initiated by either the mobile station 100 or the switching network 200 when transferring data packets.

Here, packet data communications are typically carried out over various GPRS channels. Typically, if an uplink packet transfer (from the mobile station 100 to the switching network 200) is already in progress over a particular channel, a downlink packet transfer (from the switching network 200 to the mobile station 100) is performed over a different channel to avoid the occurrence of packet call collisions. Alternatively, priorities can be assigned to certain types of packet calls such that only an uplink transfer or a downlink transfer is performed over one particular channel.

More specifically, a so-called "packet call collision" can be generally defined as a situation where the mobile station 100 and the switching network 200 simultaneously requests a packet call from one another. For example, packet call collision is considered to have occurred when a mobile station 100 requests a packet call to the switching network 200 (S101) while the switching network 200 simultaneously requests a packet call to the mobile station 100 before transmitting a reply regarding the success or failure in processing the packet call received from the mobile station 100 (S102).

Thereafter, according to the contents of the message received from the switching system 200, the mobile station 100 can ignore the received message sent from the switching system 200 or can send a reject message to the switching system 200 (S103). The switching system 200, upon responding to the packet call request of the mobile station 100 (S104), proceeds to exchange packet data thereafter (S105).

This conventional art method of processing packet call collisions employs a technique of applying a so-called "order of priority" to all packet calls so that those of higher priority are maintained, while those of lower priority are removed. In the conventional art, packet calls originating from the mobile station 100 (i.e., uplink packet calls) are given a higher priority than those originating from the switching network 200 (i.e., downlink packet calls). Thus, when a packet call collision occurs, the packet data transfer procedure continues to proceed with only the packet call originating from the mobile station 100, while the packet calls originating from the switching network 200 are removed or ignored.

SUMMARY OF THE INVENTION

The present inventor identified certain problems in conventional packet data transfer procedures performed between the switching network and the mobile station, and provided a solution thereto. In particular, there is a problem in the conventional art in that the packet calls originating from the switching network (i.e., downlink packet calls) cannot be further processed while a packet call is being processed by the mobile station on the same channel due to the higher priority being assigned to mobile station originating packet calls (i.e., uplink packet calls).

Thus, a method of processing packet calls of a mobile communications system according to the present invention was developed to solve at least these conventional problems, so that the packet call processing can proceed if the mobile station can accommodate a packet call even when packet call collisions occur.

Also, the present invention allows an increased number of packet calls that can be processed simultaneously by a switching network and/or a mobile station, so that effective use of various application programs involving internet (or wireless) data transmissions, electronic mail service, electronic file transfer techniques, and the like can be achieved.

As such, the present invention provides a method and apparatus for packet call processing in a mobile communications system, whereby upon the occurrence of a packet call collision between a mobile station and a switching network, it is determined whether a Network (Layer) Service Access Point Identifier (NSAPI) can be assigned to the mobile station, then allowing the mobile station to receive a packet call requested from the switching network and to reply to the packet call request if the NSAPI can be assigned, and allowing the switching network to reply to the packet call request of the mobile station, and thereafter exchanging packet data between the mobile station and the switching network.

BRIEF DESCRIPTION OF THE DRAWINGS

FIG. 2 depicts a schematic diagram of a packet call processing for mobile communications in accordance with the conventional art; and FIG. 3 depicts a schematic diagram of a packet call processing for mobile communications in accordance with the present invention.

DETAILED DESCRIPTION

Figure 1:
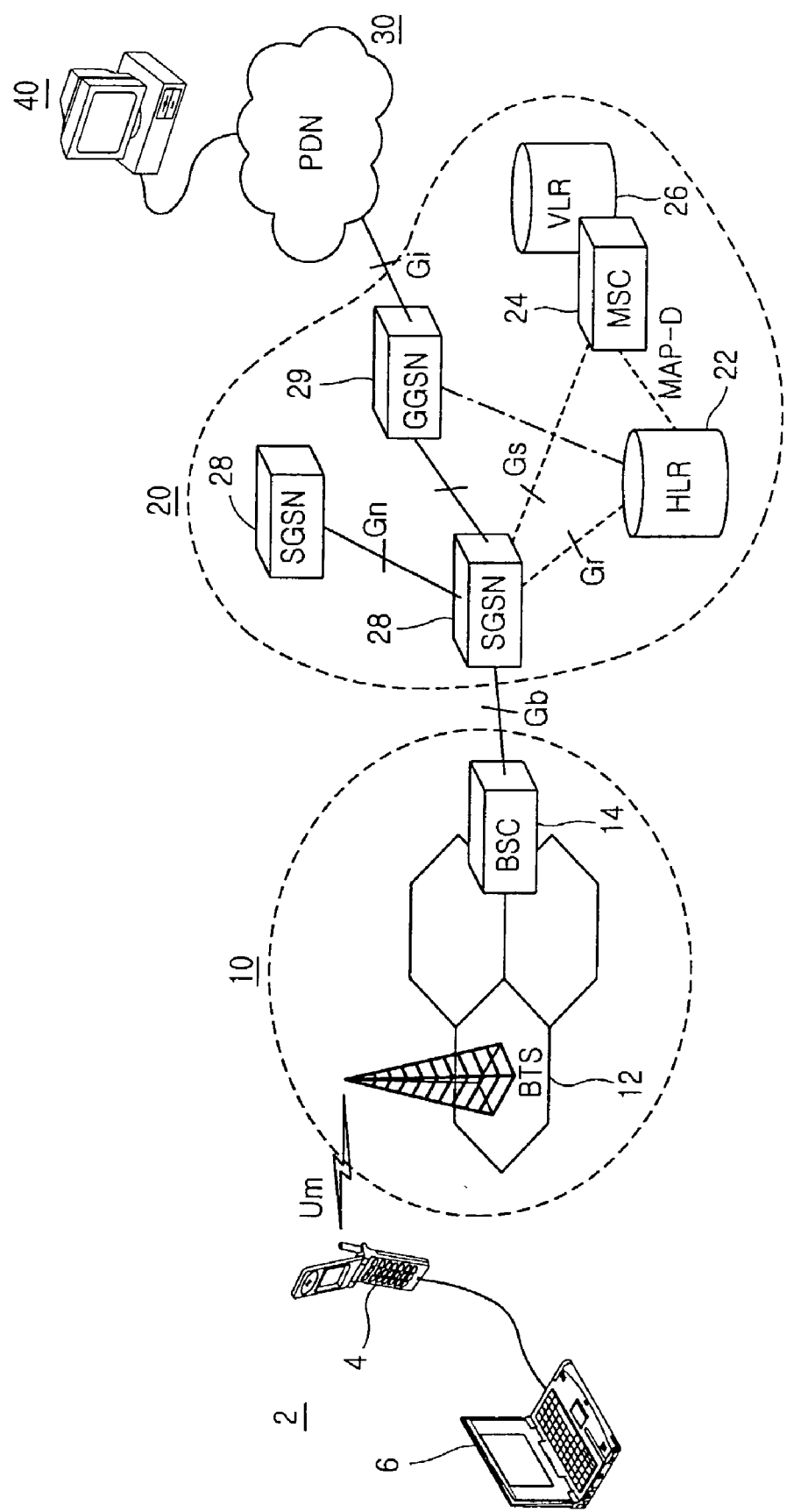
FIG. 1 depicts a logical architecture of a GPRS network.

Although various types of wireless and communications technologies (such as GSM, Universal Mobile Telephone Service (UMTS), third generation (3G) mobile systems, etc.) are envisioned to fall within the applicability scope of the present invention, the following description mainly focuses on GSM and GPRS networks and techniques to exemplify various features of the present invention in contrast with the conventional GSM/GPRS techniques described above.

The gist of the present invention pertains to packet data transferring between the switching network (such as a GSM network, a UMTS network, a 3G network, etc.) and a mobile station. Thus, a detailed description of other elements and components that may be employed in a mobile communications system (such as a GSM network, a UMTS network, etc.), as understood by those in the art, have been omitted herewith for the sake of brevity and so that the description of the present invention is not obscured.

FIG. 3 shows the procedures between a mobile station and a switching network of a mobile communications system when there is a packet call collision in accordance with the present invention.

As in the conventional art, after the mobile station 300 requests a packet call to the switching network (S201), the switching network 400, in response, requests a packet call to the mobile station 300 prior to transmitting a reply regarding the success or failure in processing the packet call received from the mobile station 300 (S202). However, the following steps according to the present invention differ from those of the conventional art.

Prior to discussing the details of the present invention, it should be noted that a mobile station could have multiple simultaneous connections, with various components in a mobile (or wireless) communications system (including the switching network 400), using different protocols.

Connections using different protocols are discriminated using a Network Layer Service Access Point Identity (NSAPI). In other words, the NSAPI specifies the type of protocol being used.

In general, the Network Layer Service Access Point Identifier (NSAPI) refers to a service providing point used for transmitting packet data from a layer-3 entity. Usually, the protocol provided from the mobile station 300 is in the form of a "protocol stack" having a layered structure. Here, the protocol is a set of rules and formats (semantic and syntactic) that determines the communication behavior of layer entities (such as the layer-3 entity) in the performance of the layer functions. A "primitive" provided from each layer must be employed in order to use one type of data service. For discriminating where primitives are used, a Service Access Point Identifier (SAPI) is used, whereby NSAPI refers to the particular SAPI used in transmitting packet data. Thus, the protocol which controls packet call processing for allocating NSAPI, checks whether an NSAPI that can be used is available prior to requesting a packet call.

More specifically, the NSAPI is the identifier that specifies the PDP context in the mobile station 300 and in SGSN (previously described in the Background Art). Here, PDP refers to Packet Data Protocol, e.g., IP or X.25; the protocol that is used by the user. SGSN refers to the serving GPRS support node element, which is a new functional element of the GPRS network. As such, the NSAPI is needed in the mobile station 300 in order to be able to discriminate between different packet data protocols.

Usually, sixteen NSAPIs (0 through 15) are provided for the packet protocol, and in general, eleven NSAPIs (5 through 15) can be used and allocated in processing packet calls. The particular values of the NSAPI field may be any one of the following:

| 0 | Escape mechanism for future extensions |
|---|---|
| 1 | Point-to-multipoint multicast (PTM-M) information |
| 2~4 | Reserved for future user |
| 5~15 | Dynamically allocated NSAPI value |

In accordance with the present invention, the mobile station 300 determines whether a Network Layer Service Access Point Identifier (NSAPI) can be allocated and receives the packet call requested from the switching network 400 if NSAPI allocation was determined to be possible (S203). Here, a processor or processing means (not shown in the drawings) in the mobile station 300 can perform the necessary determination and allocation of the NSAPIs.

If NSAPI allocation is not possible, the mobile station 300 ignores the packet call request or transmits a "reject" message to the switching network 400 (S205). The processor or processing means (not shown in the drawings) in the mobile station 300 can perform these functions.

However, if NASAPI allocation is possible, the mobile station 300 replies to the packet call requested by the switching network 400 (S204) and further processing is performed (S206~S208). Again, the processor or processing means in the mobile station 300 can perform its replying and further processing.

During further processing, the switching network 400 replies to the packet call request of the mobile station 300 (S206), and then sends a final reply regarding packet call request of the mobile station 300 (S207). Here, a processor or processing means in the switching network 400 can perform the signal processing for replying the mobile station 300. Thereafter, packet data can be exchanged between the mobile station 300 and the switching network 400 (S208).

Thus, if any of the eleven NSAPIs (5 through 15) are available (i.e., if there exists an NSAPI that has not been allocated), packet call processing can proceed. If no NSAPIs can be allocated, packet call processing cannot proceed, and a call failure processing procedure is performed. In other words, even when packet call collision occurs between the mobile station 300 and the switching network 400, if there are any NSAPIs available for allocation for the protocol that controls packet call processing, the packet call can proceed. Only when there are no NSAPIs available for allocation, would the packet call collision procedures be performed to reject the packet call request from the switching network 400 in a manner similar to the conventional art.

According to the conventional art, if a packet call is requested by the switching network 400 after the mobile station 300 requests a packet call but prior to receiving a success or failure reply, this situation was unconditionally (i.e., absolutely) regarded as a call collision and the packet call from the switching network 400 was processed no further. However, according to the present invention, the packet call (from the switching network 400) can be subsequently processed if the mobile station 300 can accommodate the call.

The ability to accommodate a packet call refers to the possibility of whether allocation of an NSAPI used during packet call processing. When NSAPI allocation is possible, the call can be subsequently processed. Here, eleven NASPIs (5 through 15) can be allocated, thus allowing the use of a multi-packet call. If NASPI allocation is not possible, packet call collision processing procedures are progressed.

As such, various types of packet calls, not only those sent by the switching network 400, can be processed by the present invention to handle packet call collisions. For example, the packet call collision detection and NSAPI allocation procedures may be used to allow or reject packet calls sent by the mobile station 300. Similarly, the present invention techniques can be applies to resolve packet call collisions occurring between a plurality of packet calls sent by the same network element (e.g., the mobile station 300, the switching network 400, etc.). Thus, according to the present invention, various types of packet call collisions are resolved as long as the mobile station 300 can handle the packet call by allocating available NSAPIs.

Accordingly, the packet call collision processing method of the present invention using packet calls as a basis can be employed in various application programs involving internet (or wireless) data transmission, electronic mail service, electronic file transfer techniques, and other Internet-based applications, as well as other high-speed data applications.

The present invention provides a method and apparatus for processing packet calls in a mobile communications system comprising a switching network and at least one mobile station, the method comprising: detecting a packet call collision between a first packet call request and a second packet call request; determining, in response to the detecting, whether a first identifier can be allocated to process the first packet call request and whether a second identifier can be allocated to process the second packet call request; and handling, in response to the determining, the first and second packet call requests.

Also, the present invention provides a method and apparatus for processing packet calls in a mobile communications system comprising a switching network and at least one mobile station, wherein the method comprises: sending a mobile station packet call request; receiving a switching network packet call request; detecting a packet call collision between the packet call requests; determining whether a Network Layer Access Point Identifier (NSAPI) can be allocated to process the switching network packet call; sending a reply informing an acceptance of the switching network packet call if an NSAPI can be allocated, or a reply informing a rejection of the switching network packet call if an NSAPI cannot be allocated; receiving a reply informing an acceptance of the mobile station packet call; and exchanging packet data between the mobile station and the switching network in accordance with the sent and received replies in order to process packet calls therebetween.

As described hereinabove, the method of packet call processing in a mobile communications system according to the present invention can proceed to process a data packet call if the mobile station has the ability to accommodate the packet call even when packet call collision occurs. Thus, the present invention has the effect of improving the effective use of various applications requiring packet call processing.

Although the above description mainly focused on GSM and GPRS techniques, one skilled in the are would have understood that the present invention is also applicable to other wireless and/or mobile communications environments, such as UTMS, involving data packet transmissions whereby packet call collisions may occur.

UMTS is a third generation (3G) mobile system being developed by ETSI with the ITU's IMT-2000 framework. UMTS will provide data speeds of up to about 2 Mbps, making portable videophones a reality. UMTS integrates packet and circuit data transmission with the advantages of virtual connectivity to the network at all times, and provides alternative methods of billing subscribers as demanded by many emerging data services. Such methods may include pay-per-bit, pay-per-session, flat rate, uplink/downlink asymmetric bandwidth to name a few. Also, UMTS is being designed to offer data rate on demand, which in combination with packet data will make operation of the overall communications system much cheaper.

UMTS seeks to build on and extend the capability of today's mobile, wireless and satellite technologies by providing increased capacity, data capability and a far greater range of services using an innovative radio access scheme and an enhanced, evolving core network. UMTS is conceived as a global system, comprising both terrestrial and satellite components. Satellite technology can readily provide global coverage and service and it is expected to play an important role for UMTS worldwide coverage. UMTS is being standardized to ensure an efficient and effective roaming and handover between satellite and terrestrial networks.

The development of UMTS and full commercial deployment will be reached by extending the capabilities of GSM with packet and high-speed data operation, and by practical implementations of pre-UMTS trials employing subsets of existing GSM networks and/or isolated packet-based networks. As such, the techniques of the present invention described above mainly in terms of GSM and GPRS technologies are also applicable to UMTS technologies.

This specification describes various illustrative embodiments of the method of the invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

What is claimed is:

1. A method of processing packet calls in a mobile communications system comprising a switching network and at least one mobile station, the method comprising:
   detecting a packet call collision between a first packet call request and a second packet call request;
   determining, in response to the detecting, whether a first identifier can be allocated to process the first packet call request and whether a second identifier can be allocated to process the second packet call request; and
   handling, in response to the determining, the first and second packet call requests wherein the identifiers are Network layer Access point Identifiers (NSAPIs).

2. The method of claim 1, wherein the handling comprises:
   allowing the first packet call request and/or second packet call request to be processed if a first identifier and/or a second identifier can be allocated respectively thereto; and
   exchanging packet data between the mobile station and the switching network in accordance with the allowing, for performing the first and/or second packet call request.

3. The method of claim 1, wherein the handling comprises:
   rejecting the first packet call request and/or the second packet call request
   if a first identifier and/or a second identifier cannot be allocated respectively thereto; and
   terminating the first packet call and/or the second packet call in accordance with the rejecting.

4. The method of claim 1, wherein the first packet call request is sent from the mobile station.

5. The method of claim 4, wherein the second packet call request is sent from the switching network.

6. The method of claim 1, wherein the packet call requests relate to activating packet data protocol (PDP) contexts.

7. The method of claim 1, wherein sixteen NSAPIs are provided for packet call processing, and eleven of the sixteen NSAPIs can be allocated.

8. The method of claim 1, wherein the detecting and determining are performed by the mobile station.

9. A method of processing packet calls in a mobile communications system comprising a switching network and at least one mobile station, the method comprising:
   sending a mobile station packet call request;
   receiving a switching network packet call request;
   detecting a packet call collision between the packet call requests;
   determining whether a Network Layer Access Point Identifier (NSAPI) can be allocated to process the switching network packet call;
   sending a reply informing an acceptance of the switching network packet call if an NSAPI can be allocated, or a reply informing a rejection of the switching network packet call if an NSAPI cannot be allocated;
   receiving a reply informing an acceptance of the mobile station packet call; and
   exchanging packet data between the mobile station and the switching network in accordance with the sent and received replies in order to process packet calls therebetween.

10. The method of claim 9, wherein the packet call requests relate to activating packet data protocol (PDP) contexts.

11. The method of claim 9, wherein sixteen NSAPIs are provided for packet call processing, and eleven of the sixteen NSAPIs can be allocated.

12. An apparatus for processing packet calls in a mobile communications system comprising a switching network and at least one mobile station, the apparatus comprising:
   a detector detecting a packet call collision between a first packet call request and a second packet call request; and
   a processor operatively connected with the detector for determining, in response to the detecting, whether a first identifier can be allocated to process the first packet call request and whether a second identifier can be allocated to process the second packet call request, handling, in response to the determining, the first and second packet call requests wherein the identifiers are Network layer Access point Identifiers (NSAPIs).

13. The apparatus of claim 12, wherein the processor:
   allows the first packet call request and/or second packet call request to be processed if a first identifier and/or a second identifier can be allocated respectively thereto; and
   exchanges packet data between the mobile station and the switching network in accordance with the allowing, for performing the first and/or second packet call request.

14. The apparatus of claim 12, wherein the processor:
   rejects the first packet call request and/or the second packet call request if a first identifier and/or a second identifier cannot be allocated respectively thereto; and
   terminates the first packet call and/or the second packet call in accordance with the rejecting.

15. The apparatus of claim 12, wherein the mobile station sends the first packet call request to the switching network.

16. The apparatus of claim 15, wherein the switching network sends the second packet call request to the mobile station.

17. The apparatus of claim 12, wherein the packet call requests relate to activating packet data protocol (PDP) contexts.

18. The apparatus of claim 12, wherein sixteen NSAPIs are provided for packet call processing, and eleven of the sixteen NSAPIs can be allocated.

19. An apparatus for processing packet calls in a mobile communications system comprising a switching network and at least one mobile station, the apparatus comprising:
   a processor for sending a mobile station packet call request and receiving a switching network packet call request; and
   a detector for detecting a packet call collision between the packet call requests sent and received by the processor, wherein the processor further,
   determines whether a Network Layer Access Point Identifier (NSAPI) can be allocated to process the switching network packet call;
   sends a reply informing an acceptance of the switching network packet call if an NSAPI can be allocated, or a reply informing a rejection of the switching network packet call if an NSAPI cannot be allocated;
   receives a reply informing an acceptance of the mobile station packet call; and
   exchanges packet data between the mobile station and the switching network in accordance with the sent and received replies in order to process packet calls therebetween.

20. The apparatus of claim 19, wherein the packet call requests relate to activating packet data protocol (PDP) contexts.

21. The apparatus of claim 19, wherein sixteen NSAPIs are provided for packet call processing, and eleven of the sixteen NSAPIs can be allocated.

* * * * *